(12) United States Patent
Sautto (10) Patent No.: US 6,968,267 B2
(45) Date of Patent: Nov. 22, 2005

(54) COMPUTING METHOD OF ENGINE INTAKE AIR AMOUNT AND AIR FUEL RATIO CONTROL METHOD AND APPARATUS USING THE SAME

(75) Inventor: Umerjan Sautto, Kanagawa (JP)

(73) Assignee: Nikki Co., Ltd., Kanagawa (JP)

( * ) Notice: Subject to any disclaimer, the term of this patent is extended or adjusted under 35 U.S.C. 154(b) by 0 days.

(21) Appl. No.: 10/940,751

(22) Filed: Sep. 15, 2004

(65) Prior Publication Data
US 2005/0102092 A1    May 12, 2005

(30) Foreign Application Priority Data
Nov. 10, 2003 (JP) .............................. 2003-379298

(51) Int. Cl.$^7$ ................................................ B60T 7/12
(52) U.S. Cl. ...................................... 701/103; 701/104
(58) Field of Search ................................. 701/103, 104

(56) References Cited

U.S. PATENT DOCUMENTS

| | | | | |
|---|---|---|---|---|
| 4,106,448 A | * | 8/1978 | Noguchi et al. ............. | 123/268 |
| 5,715,797 A | * | 2/1998 | Minagawa et al. ......... | 123/497 |
| 6,530,214 B2 | * | 3/2003 | Ikemoto et al. ............... | 60/285 |

* cited by examiner

*Primary Examiner*—John T. Kwon
(74) *Attorney, Agent, or Firm*—Rader, Fishman & Grauer PLLC (57) ABSTRACT

A computing method of an engine intake air amount for determining a fuel injection amount comprises a step of computing an engine intake amount in real time by using a relational expression between an engine speed and an intake manifold pressure expressed by $Q_c=k_c(-a_1N-a_2P+a_3NP+a_4N^2P+a_5NP^2)$ where $Q_c$ is an intake air amount of an engine cylinder, $k_c$, $a_1$, $a_2$, $a_3$, $a_4$ and $a_5$ are constants, N is an engine speed and P is an intake manifold pressure.

3 Claims, 9 Drawing Sheets

COMPUTING METHOD OF ENGINE INTAKE AIR AMOUNT AND AIR FUEL RATIO CONTROL METHOD AND APPARATUS USING THE SAME

BACKGROUND OF THE INVENTION

1. Field of the Invention

The present invention relates to a method of computing an engine intake air amount for determining a basic injection amount of a fuel supplied to an engine, and a method and apparatus for executing an air fuel ratio control using the computing method.

2. Description of the Related Art

The engine intake air amount is an important data for determining a basic injection amount of the fuel. An accurate air fuel ratio control can be executed by determining the fuel injection amount by using the engine intake air amount. For example, as described in Japanese Unexamined Patent Publication No. 58-32964, the engine intake air amount is generally computed by metering an intake pipe air flow rate per a unit time by a flow meter such as a vortex flow meter placed in an upstream side of a throttle valve in the intake pipe. However, since the intake pipe has various lengths and shapes as well as an air density correction is necessary in this method, it is hard to accurately know an amount of air which is actually sucked into a cylinder, so that it is not easy to control a fuel injection valve so as to achieve a theoretical air fuel ratio.

On the other hand, there has been known a method of computing an intake air amount per one cycle on the basis of a map, by setting an engine speed and an intake pipe pressure to an input variable. Further, as described in Japanese Unexamined Patent Publication No. 57-70934, there has been known an air fuel ratio control method of feedback controlling an air fuel ratio of air-fuel mixture supplied to the engine to a predetermined air fuel ratio by detecting the air fuel ratio on the basis of an exhaust gas component of the engine in addition to the structure mentioned above. Since this method can compute a correction amount in correspondence to a condition of the engine, it is possible to quickly respond even at an engine transition time so as to easily control to a predetermined air fuel ratio. However, since no fixed correlation exists between detected values, it is necessary to map a correction amount with respect to each of the parameters so as to store in a memory. Further, since a lot of nonlinear elements exist in an engine system, it is actually very hard to determine an accurate intake air amount from the map so as to execute an accurate air fuel ratio control.

SUMMARY OF THE INVENTION

The present invention intends to solve the problem mentioned above, and an object of the present invention is to provide a computing method of an air amount sucked to a cylinder of an engine of accurately computing the air amount on the basis of a physical relation between an engine speed and an intake manifold pressure in place of computing on the basis of a flow rate detected by a flow meter, thereby achieving an excellent air fuel ratio control.

The inventor of the present invention has repeated studies for preparing a relational expression and checking rightness of the relational expression, with respect to a correlation among an intake air amount of an engine cylinder, an engine speed and an intake manifold pressure. As a result, the inventor has reached a matter that an actual cylinder intake air amount can be accurately estimated on the basis of the following relational expression. In other words, the present invention computes an engine intake amount for determining a fuel injection amount in real time by using a relational expression expressed by $Q_c = k_c(-a_1 N - a_2 P + a_3 NP + a_4 N^2 P + a_5 NP^2)$ (in this expression, $Q_c$ is an intake air amount of an engine cylinder, $k_c$, $a_1$, $a_2$, $a_3$, $a_4$ and $a_5$ are constants, $N$ is an engine speed and $P$ is an intake manifold pressure).

Accordingly, since the intake air amount of the engine cylinder can be directly and accurately computed on the basis of a physical relation between the engine speed and the intake manifold pressure, it is neither necessary to use the flow meter as in the prior art nor necessary to prepare and store the map. It is possible to sequentially compute an accurate intake air amount so as to execute an accurate air fuel ratio control.

Further, there is provided an air fuel ratio control method of detecting an engine speed and an intake manifold pressure, computing an engine intake air amount on the basis of the relational expression, and determining a fuel injection amount so as to achieve a target air fuel ratio on the basis of the computed value, or there is provided an air fuel ratio control apparatus provided with an electronic control apparatus storing a program for computing an engine intake air amount by using the relational expression, and sensors respectively detecting an engine speed and an intake manifold pressure, wherein the electronic control apparatus determines a fuel injection amount on the basis of an engine intake air amount obtained by substituting the engine speed and the intake manifold pressure detected by the respective sensors for the relational expression. Accordingly, it is possible to quickly respond to a change of an engine operating state so as to execute an accurate air fuel ratio control.

In accordance with the present invention, the air amount sucked into the cylinder of the engine can be accurately computed at a sequential time on the basis of the physical relation between the engine speed and the intake manifold pressure, in place of being computed on the basis of the detected flow rate by the flow meter, and it is possible to rapidly and accurately respond to the change of the engine operation state so as to achieve an excellent air fuel ratio control.

DESCRIPTION OF THE PREFERRED EMBODIMENT

Figure 1:
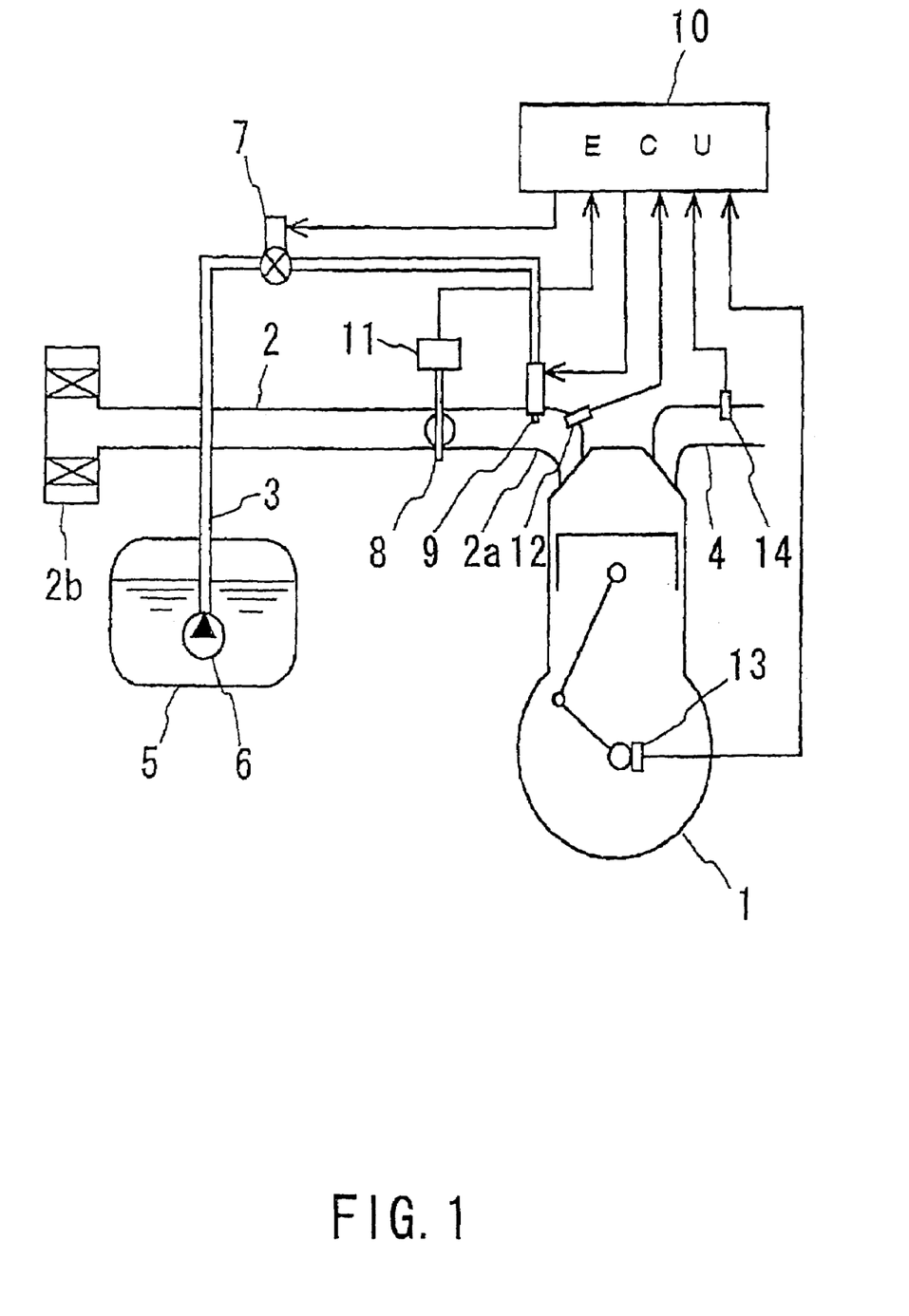
FIG. 1 is an arrangement view showing an embodiment in accordance with the present invention.

A description will be given of an embodiment in accordance with the present invention with reference to the accompanying drawings. FIG. 1 shows an arrangement view of an engine system equipped with an electronic control apparatus 10 for executing a computing method of an engine intake air amount in accordance with the present invention. An engine 1 is structured such that a liquid fuel in a fuel tank 5 is pressurized by a fuel pump 6 and is supplied from a fuel injection valve 9 placed in an intake manifold 2a of an intake pipe 2 through a fuel pipe 3. The intake pipe 2 is structured such that an air cleaner 2b is arranged in an air intake port side and a throttle valve 8 is arranged in an inlet of the intake manifold 2a.

The electronic control apparatus 10 is structured such as to open and close a fuel cut-off valve 7 and the fuel injection valve 9 arranged in the fuel pipe 3, and input signals from a throttle valve opening degree sensor 11 arranged in the throttle valve 8, a pressure sensor 12 arranged in the intake manifold 2a and detecting an intake manifold pressure, a crank sensor 13 arranged in a crank shaft of the engine 1 and detecting an engine speed, and an oxygen sensor 14 arranged in an exhaust pipe 4 and detecting an oxygen concentration in an exhaust gas.

The electronic control apparatus 10 is provided with CPU, ROM and RAM which are not illustrated, and the ROM stores a program for making the CPU to execute a computation of the engine intake air amount using the relational expression expressed by $Q_c=k_c(-a_1N-a_2P+a_3NP+a_4N^2P+a_5NP^2)$ (in this expression, $Q_c$ is an intake air amount of an engine cylinder, $k_c$, $a_1$, $a_2$, $a_3$, $a_4$ and $a_5$ are constants, N is an engine speed and P is an intake manifold pressure). In this case, the program is obtained by executing a simulation by substituting respective proper numerical values for the constants $k_c$, $a_1$, $a_2$, $a_3$, $a_4$ and $a_5$ and setting the numerical values at a time when an aimed result is obtained, in the engine system mounting the electronic control apparatus 10 thereon.

When the engine 1 is started, the crank sensor 13 detects the engine speed, and the pressure sensor 12 detects the intake manifold pressure. The electronic control apparatus 10 calculates and computes the intake air amount in real time by using the relational expression on the basis of the data. Further, the electronic control apparatus 10 determines the corresponding fuel injection amount so as to achieve a target air fuel ratio, thereby controlling the fuel injection valve 9 so as to open and close. The detection and control are executed in real time, and rapidly responds to a sudden change of an operation condition at a time of an engine transition or the like without delaying, whereby it is possible to achieve an excellent air fuel ratio control. In this case, the electronic control apparatus 10 is structured such as to correct the fuel injection amount on the basis of the opening degree of the throttle valve 8 detected by the throttle valve opening sensor 11, the exhaust gas state detected by the oxygen sensor 14, and the engine operating condition detected by the other sensors (not shown).

A description will be given below of a result of study obtained by executing experiments and simulations with regard to rightness of the computing method of computing the engine intake air amount in accordance with the present invention.

Figure 2A:
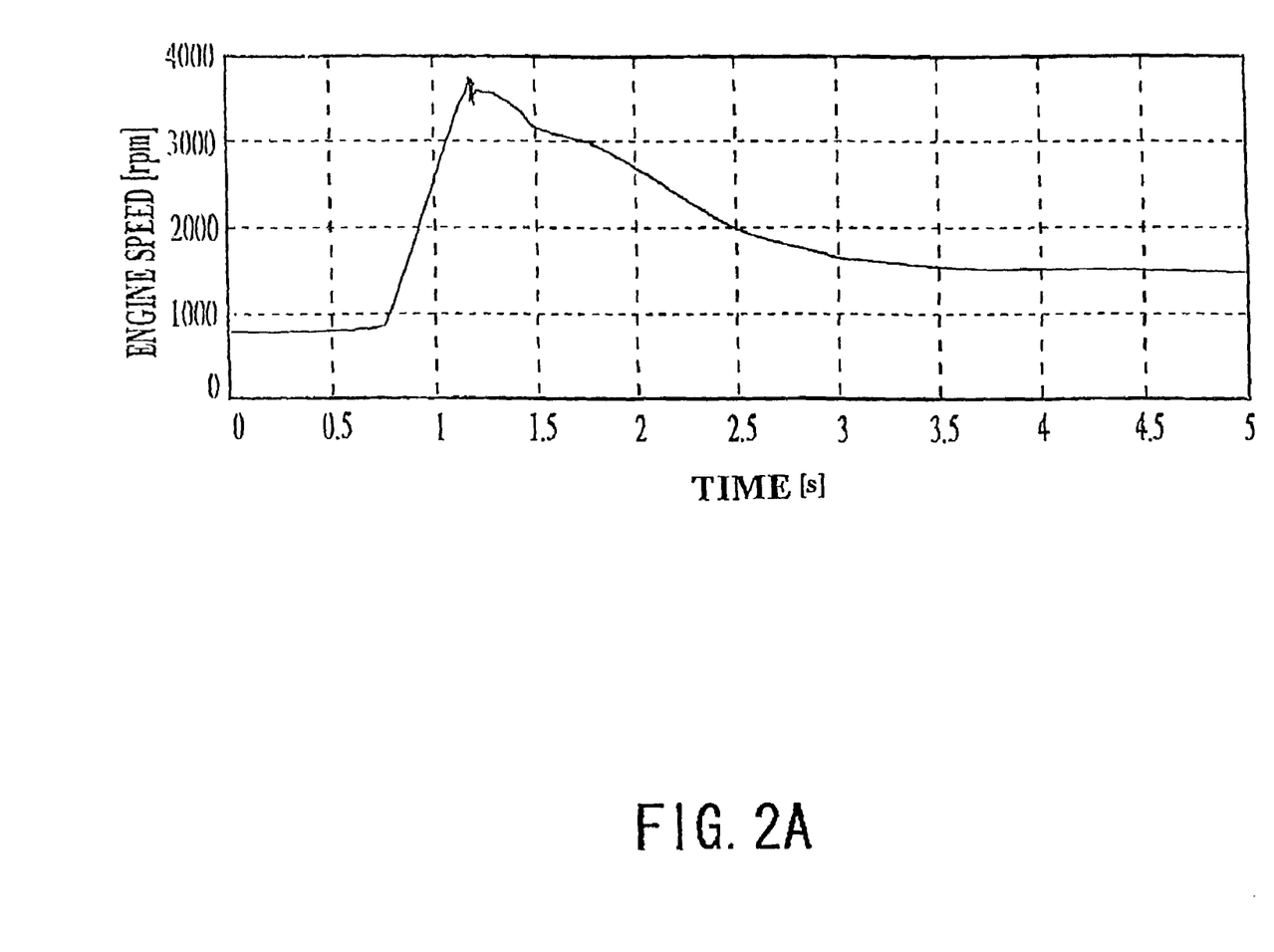
FIGS. 2A and 2B are graphs showing an experimental result of an engine speed and an intake manifold pressure.
Figure 2B:
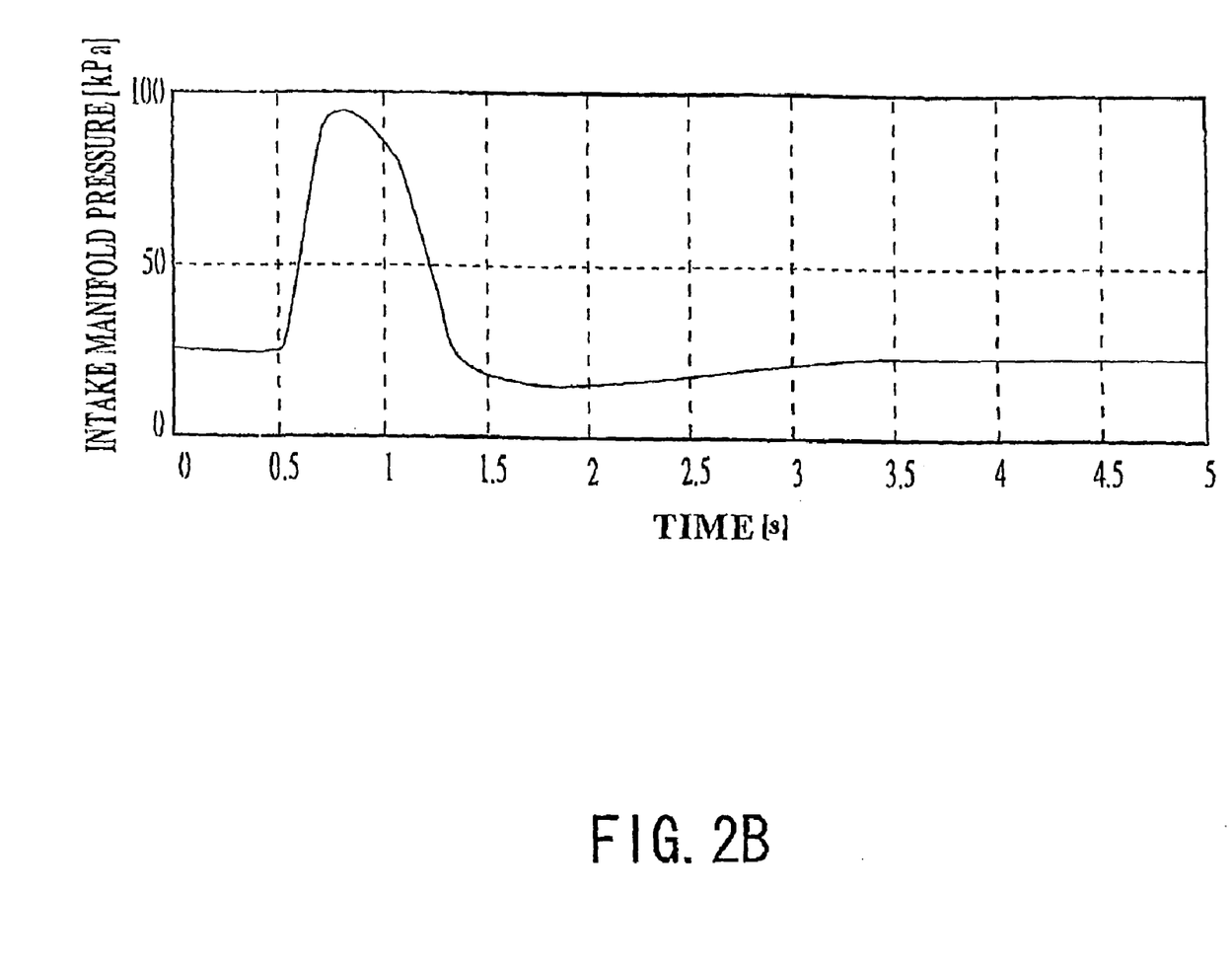
Figure 2C:
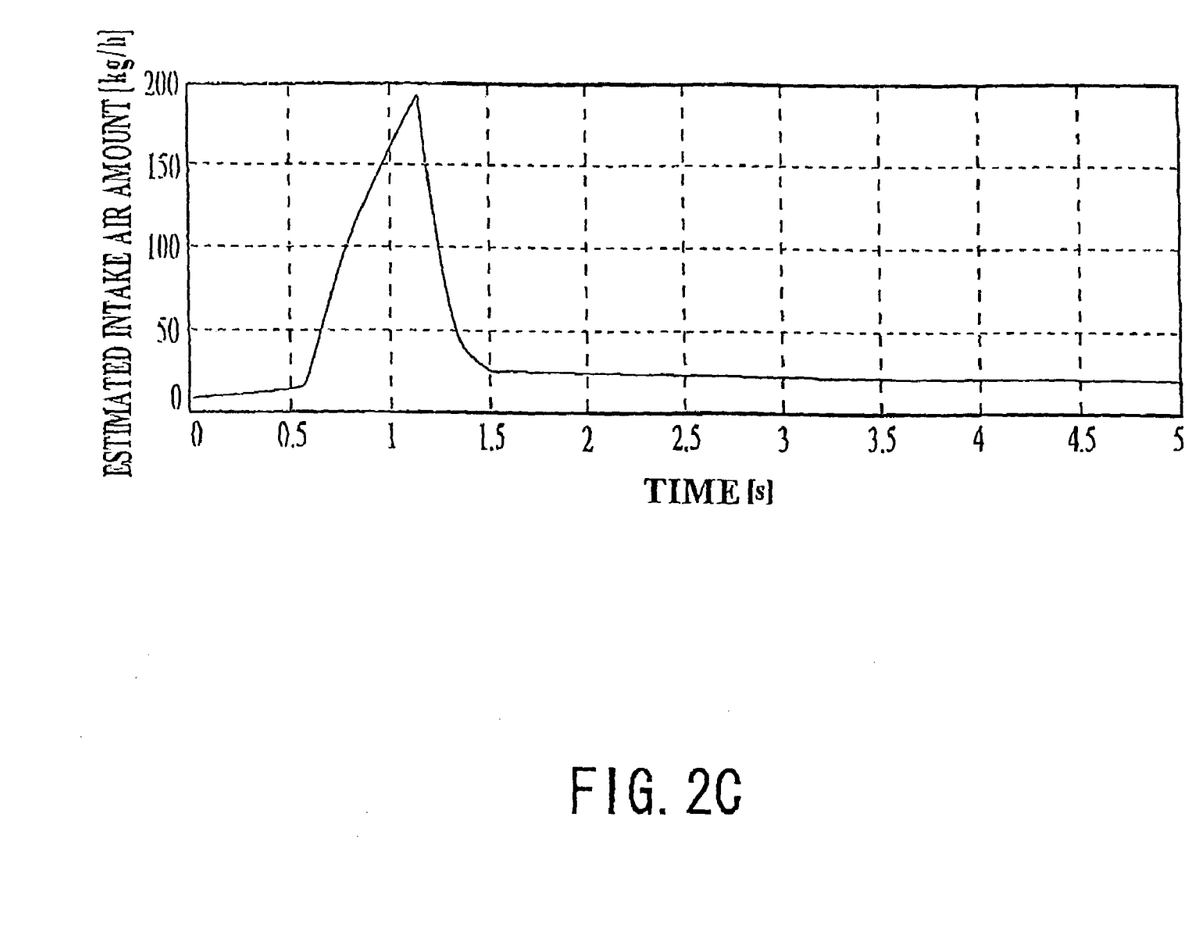
FIG. 2C is a graph showing an estimated intake air amount obtained on the basis of a relational expression in accordance with the present invention.
Figure 3:
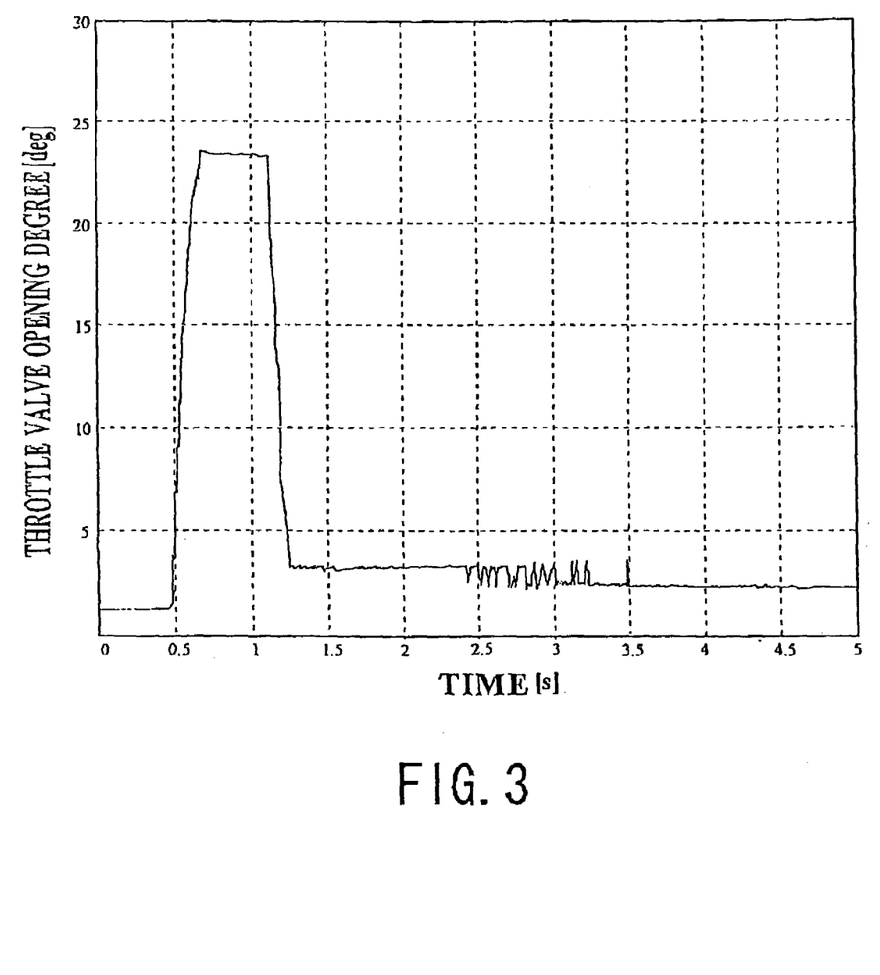
FIG. 3 is a graph showing a throttle valve opening degree for obtaining the graphs in FIGS. 2A to 2C.

FIGS. 2A and 2B are graphs showing an experimental result of an engine speed and an intake manifold pressure with respect to a throttle valve opening degree shown in FIG. 3 and FIG. 2C shows an estimated value of an intake air amount obtained on the basis of the relational expression in accordance with the present invention.

Figure 4A:
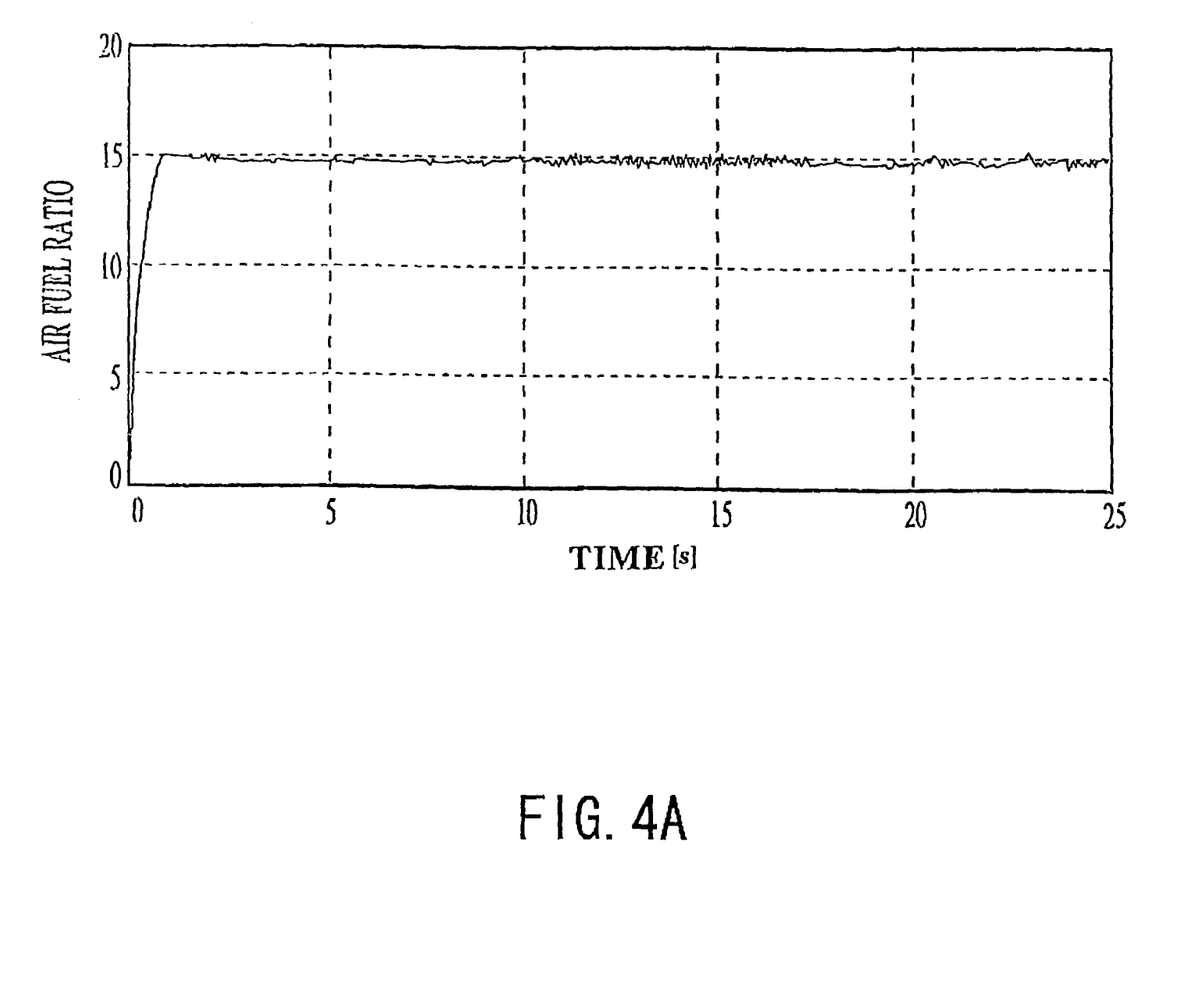
FIG. 4A is a graph expressing a simulation result in the case that an air fuel ratio control is executed by using the estimated intake air amount expressed by FIG. 2C.
Figure 4B:
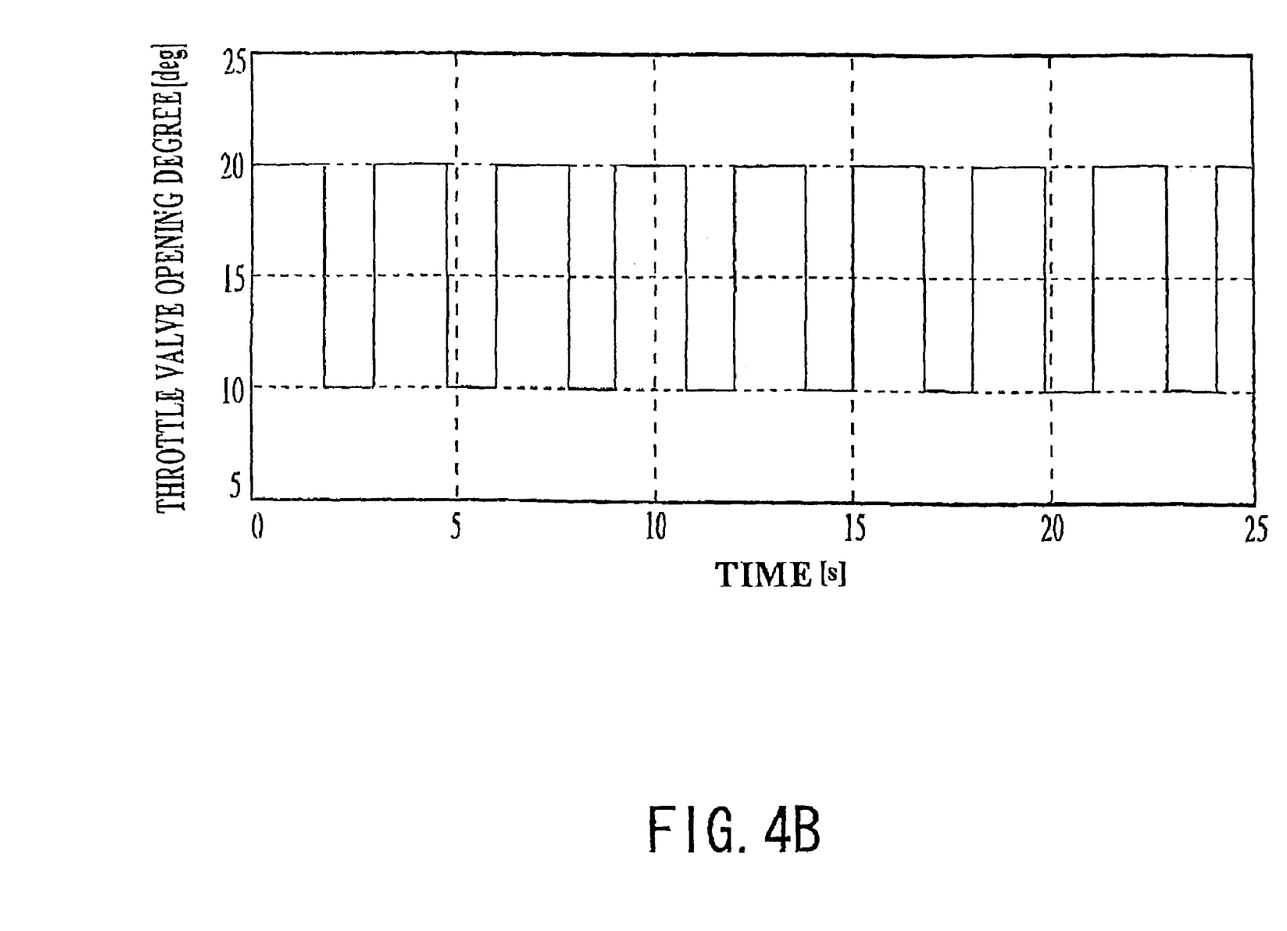
FIG. 4B is a graph expressing a throttle valve opening degree at a time shown in FIG. 4A.

FIG. 4A shows a graph expressing a simulation result in the case that an air fuel ratio control is executed by using the estimated intake air amount expressed by FIG. 2C, FIG. 4B shows a graph expressing a throttle valve opening degree at a time shown in FIG. 4A. Accordingly, in spite of a large and sudden change of the throttle valve opening degree, it is known that the intake air amount smoothly follows to the given target air fuel ratio, so that it is understood that the relational expression in accordance with the present invention accurately estimates the intake air amount of the engine cylinder in real time.

Figure 5A:
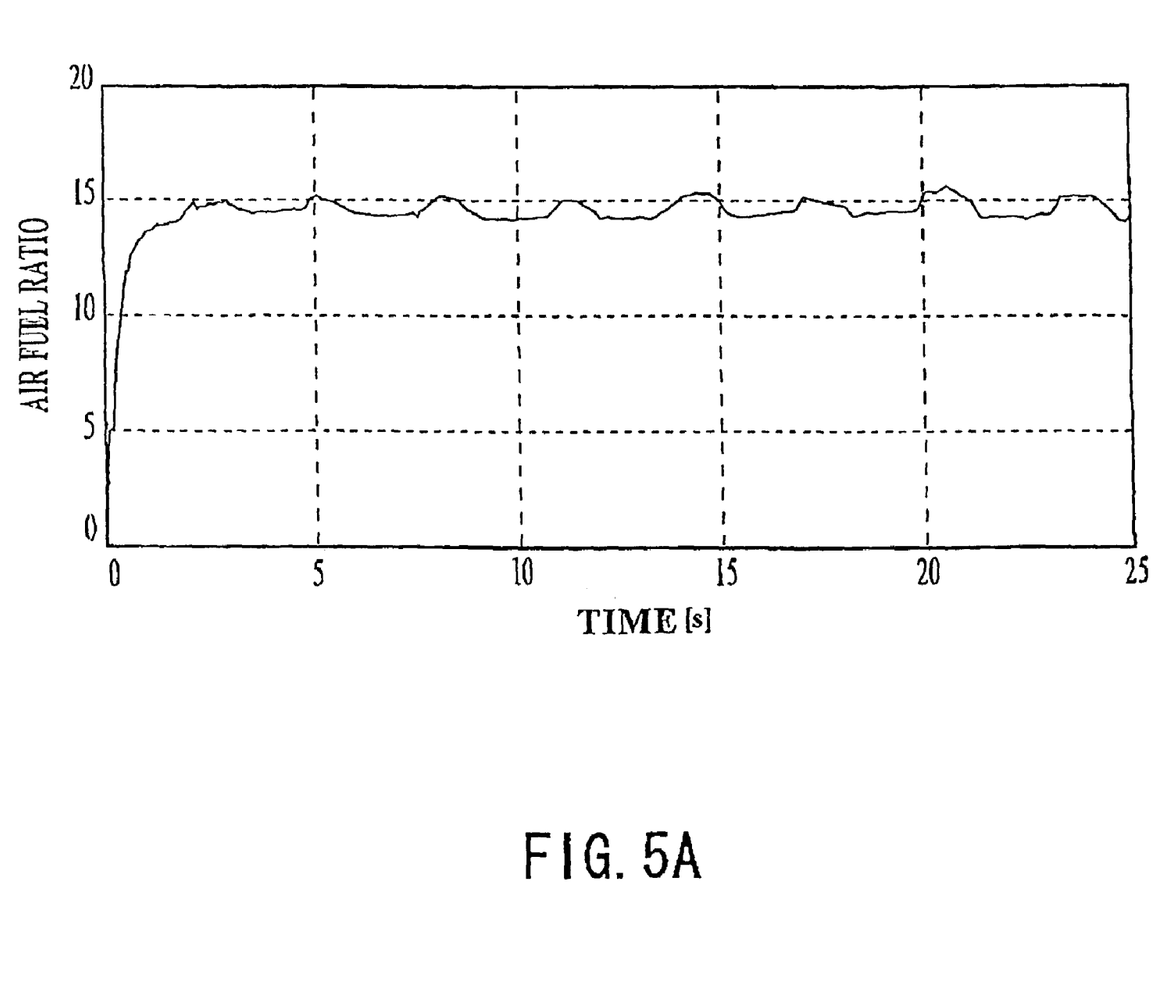
FIG. 5A is a graph expressing a simulation result in the case that an air fuel ratio control is executed in accordance with the conventional method.
Figure 5B:
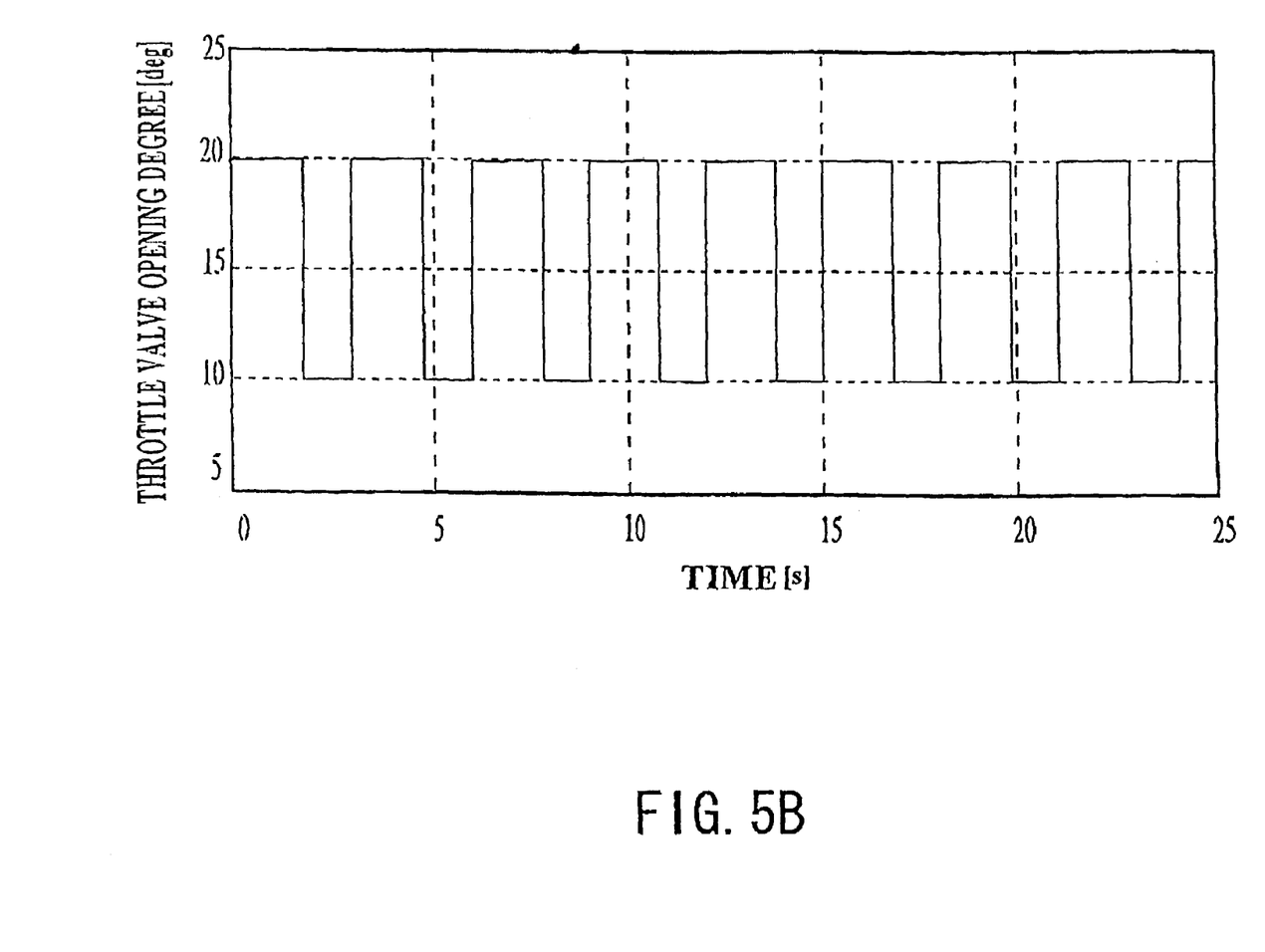
FIG. 5B is a graph expressing a throttle valve opening degree at a time shown in FIG. 5A.

On the other hand, FIG. 5A shows a graph expressing a simulation result in the case that an air fuel ratio control is executed in accordance with the conventional method, and FIG. 5B shows a graph expressing a throttle valve opening degree at a time shown in FIG. 5A. Since an air amount flowing through the cylinder is not accurately estimated with respect to the large and sudden change of the throttle valve opening degree (the transient operation of the engine), the air fuel ratio fluctuates extremely largely near the target air fuel ratio, so that it is known that the air fuel ration control is not accurately executed. On the basis of the result, it can be said that the air fuel ratio control in accordance with the present invention is extremely excellent in comparison with the air fuel ratio control in accordance with the conventional method.

As mentioned above, the engine intake air amount can be accurately computed in real time by using the relational expression mentioned above corresponding to a nonlinear relational expression between the engine speed and the intake manifold pressure, and an excellent air fuel ratio control can be realized without detecting the intake air amount by using the flow meter.

What is claimed is:

1. A computing method of an engine intake air amount for determining a fuel injection amount comprising a step of detecting an engine speed and an intake manifold pressure computing an engine intake air amount in real time by using a relational expression between an engine speed and an intake manifold pressure expressed by $Q_c=k_c(-a_1N-a_2P+a_3NP+a_4N^2P+a_5NP^2)$ (wherein, $Q_c$ is an intake air amount of an engine cylinder, $k_c$, $a_1$, $a_2$, $a_3$, $a_4$ and $a_5$ are constants, N is an engine speed and P is an intake manifold pressure.

2. An air fuel ratio control method comprising a step of detecting an engine speed and an intake manifold pressure, computing an engine intake air amount on the basis of the relational expression, $Q_c=k_c(-a_1N-a_2P+a_3NP+a_4N^2P+a_5NP^2)$, and determining a fuel injection amount so as to achieve a target air fuel ratio on the basis of the computed value, wherein, $Q_c$ is an intake air amount of an engine cylinder, $k_c$, $a_1$, $a_2$, $a_3$, $a_4$ and $a_5$ are constants, N is an engine speed and P is an intake manifold pressure.

3. An air fuel ratio control apparatus provided with an electronic control apparatus storing a program for computing an engine intake air amount by using the relational expression $Q_c=k_c(-a_1N-a_2P+a_3NP+a_4N^2P+a_5NP^2)$ (wherein $Q_c$ is an intake air engine speed and P is an intake manifold pressure, and sensors respectively detecting an engine speed and an intake manifold pressure, wherein said electronic control apparatus determines a fuel injection amount on the basis of an engine intake air amount obtained by substituting the engine speed and the intake manifold pressure detected by said respective sensors for said relational expression.

* * * * *